(12) United States Patent
Zhang et al.

(10) Patent No.: US 11,352,888 B2
(45) Date of Patent: Jun. 7, 2022

(54) TURBINE BLADE HAVING GAS FILM COOLING STRUCTURE WITH A COMPOSITE IRREGULAR GROOVE AND A METHOD OF MANUFACTURING THE SAME

(71) Applicants: NINGBO INSTITUTE OF MATERIALS TECHNOLOGY & ENGINEERING, CHINESE ACADEMY OF SCIENCES, Zhejiang (CN); NINGBO III LASERS TECHNOLOGY CO., LTD., Zhejiang (CN)

(72) Inventors: Wenwu Zhang, Ningbo Zhejiang (CN); Chunhai Guo, Ningbo Zhejiang (CN); Tianrun Zhang, Ningbo Zhejiang (CN); Yufeng Wang, Ningbo Zhejiang (CN)

(73) Assignee: NINGBO INSTITUTE OF MATERIALS TECHNOLOGY & ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 17/267,695

(22) PCT Filed: Dec. 28, 2018

(86) PCT No.: PCT/CN2018/125109
§ 371 (c)(1),
(2) Date: Feb. 10, 2021

(87) PCT Pub. No.: WO2020/029531
PCT Pub. Date: Feb. 13, 2020

(65) Prior Publication Data
US 2021/0310361 A1    Oct. 7, 2021

(30) Foreign Application Priority Data

Aug. 10, 2018 (CN) .......................... 201810911051.8

(51) Int. Cl.
*F01D 5/18* (2006.01)
(52) U.S. Cl.
CPC .......... *F01D 5/186* (2013.01); *F05D 2200/33* (2013.01); *F05D 2240/301* (2013.01);
(Continued)

(58) Field of Classification Search
CPC ..... F01D 5/186; F01D 5/187; F05D 2260/202
See application file for complete search history.

(56) References Cited

U.S. PATENT DOCUMENTS 4,684,323 A * 8/1987 Field .................. F01D 5/186
    416/97 R
4,738,588 A * 4/1988 Field .................. F01D 5/186
    416/97 R (Continued)

FOREIGN PATENT DOCUMENTS

CN    101042056 A    9/2007
CN    102022139 A    4/2011
(Continued)

OTHER PUBLICATIONS

International Search Report from International Application No. PCT/CN2018/125109 dated Apr. 26, 2019.

*Primary Examiner* — Eldon T Brockman
(74) *Attorney, Agent, or Firm* — Brundidge & Stanger, P.C.

(57) ABSTRACT

A turbine blade having a gas film cooling structure with a composite irregular groove. The turbine blade has a hollow structure, and a plurality of first grooves which are recessed grooves are provided on an outer surface thereof. A plurality of discrete holes A extending to an inner surface of the (Continued)

turbine blade are provided at the groove bottom of each first groove. The first groove is an irregular groove, and includes at least two portions in a depth direction. A portion having a depth $H_1$ from the groove bottom of the first groove is a first portion, and the rest thereof is a second portion. At least one side surface of the second portion is formed by expanding in lateral direction from a corresponding side surface of the first portion.

12 Claims, 5 Drawing Sheets

(52) U.S. Cl.
CPC .. *F05D 2250/141* (2013.01); *F05D 2250/192* (2013.01); *F05D 2250/294* (2013.01); *F05D 2260/202* (2013.01)

(56) References Cited

U.S. PATENT DOCUMENTS

| | | | | |
|---|---|---|---|---|
| 5,419,681 | A * | 5/1995 | Lee | F01D 5/186 415/115 |
| 6,932,572 | B2 * | 8/2005 | Kohli | F01D 5/141 415/115 |
| 7,246,999 | B2 * | 7/2007 | Manning | F01D 5/186 416/97 R |
| 7,374,401 | B2 * | 5/2008 | Lee | F01D 5/186 416/97 R |
| 7,563,073 | B1 * | 7/2009 | Liang | F01D 5/186 416/97 R |
| 7,887,294 | B1 * | 2/2011 | Liang | F01D 5/186 416/97 R |
| 7,997,868 | B1 * | 8/2011 | Liang | F01D 5/186 416/97 R |
| 8,057,179 | B1 * | 11/2011 | Liang | F01D 5/186 416/97 R |
| 8,066,484 | B1 * | 11/2011 | Liang | F01D 5/186 416/97 R |
| 8,672,613 | B2 * | 3/2014 | Bunker | F01D 5/186 415/115 |
| 8,851,848 | B1 | 10/2014 | Liang | |
| 9,228,437 | B1 * | 1/2016 | Liang | F01D 5/087 |
| 9,719,357 | B2 * | 8/2017 | Moody | F01D 5/186 |
| 10,233,775 | B2 * | 3/2019 | Bunker | F01D 25/12 |
| 10,378,444 | B2 * | 8/2019 | Manning | F01D 5/186 |
| 2002/0172596 | A1 * | 11/2002 | Kohli | F01D 5/186 416/1 |
| 2005/0220618 | A1 * | 10/2005 | Zhang | F01D 5/186 416/97 R |
| 2006/0073017 | A1 * | 4/2006 | Manning | F01D 5/187 416/97 R |
| 2008/0031738 | A1 * | 2/2008 | Lee | F01D 5/186 416/97 R |
| 2011/0097188 | A1 * | 4/2011 | Bunker | F01D 5/186 415/1 |
| 2012/0051941 | A1 * | 3/2012 | Bunker | F01D 5/186 416/97 R |
| 2013/0315710 | A1 * | 11/2013 | Kollati | F01D 5/186 415/116 |
| 2014/0271131 | A1 * | 9/2014 | Moody | F01D 5/186 415/116 |
| 2017/0051674 | A1 * | 2/2017 | Manning | F01D 5/186 |

FOREIGN PATENT DOCUMENTS

| | | |
|---|---|---|
| CN | 103696811 A | 4/2014 |
| CN | 203796330 U | 8/2014 |
| CN | 203867627 U | 10/2014 |
| CN | 106593543 A | 4/2017 |
| CN | 108223019 A | 6/2018 |
| CN | 108843404 A | 11/2018 |
| CN | 208845235 U | 5/2019 |

* cited by examiner

TURBINE BLADE HAVING GAS FILM COOLING STRUCTURE WITH A COMPOSITE IRREGULAR GROOVE AND A METHOD OF MANUFACTURING THE SAME

TECHNICAL FIELD

The present disclosure relates to a turbine blade used in the technical fields of aero-engines, gas turbines and the like, particularly, to a turbine blade having a gas film cooling structure with a composite irregular groove and a method of manufacturing the same.

BACKGROUND ART

One of the key points of improving the working efficiency of aero-engines and gas turbines is to use high operating temperature. Blades are the core component of power equipment such as aero-engines and gas turbines. As an important part of thermal energy conversion, turbine blades are required to work with high temperature and high pressure alternating loads, i.e., not only be able to withstand an operating temperature higher than their own melting points, but also have sufficient strength to sustain mechanical loads such as a centrifugal force. For this reason, it is necessary for blades of modern aero-engines and gas turbines to be formed of high temperature resistant base materials and high temperature resistant thermal barrier coatings, and to generate temperature gradients by using a gas film cooling technology. Turbine blades are generally made of materials such as high temperature resistant alloys, single crystal metals, and ceramic base composite materials and so on. In the future, the operating temperature of a turbine of engine will be higher and higher, and advanced film cooling technologies are required as a solution for the temperature gap between the operating temperature and the sustainable temperature of the blade material.

Generally, the turbine blade adopts a hollow structure, and a gas film cooling structure is provided to actively control the temperature of the blade, from which cooling gas is ejected to be isolated from high temperature air. The main purpose of a gas film cooling hole of gas film cooling structure is to form gas films attached to the surfaces of the blade, and it is desirable for the gas film to be formed uniformly on and attached closely to the surface of the blade closely. The gas film cooling structure used prior art was provided with straight circular holes in the early stage, which significantly increase the operating temperature as compared to a solid blade. However, the single-hole cooling protection area of the straight circular hole is relatively small, and the gas films seriously peel off when the blowing ratio is large, and thus, various three-dimensional irregular holes are widely used in advanced turbine blades, to significantly increase the single-hole cooling protection area and gas film adhesion as compared to regular holes regardless of blowing ratios. The gas film cooling holes are distributed discretely, the distribution and shape of the holes determine the uniformity of the gas film on the surface of the blades, and the uniformity of the film coverage becomes a key factor limiting the maximum cooling gradient of the turbine.

It is necessary to optimize the design of gas film hole on the premise of ensuring strength of the turbine blade. Due to requirements of aerodynamics, the turbine blade has a twisted shape, the use of gas film cooling hole can only form strong gas film coverage on a part of the blade surface, and the isolation effect of the gas film is weak at some areas or even uncovered areas occur at the blade surface. The cooling effect can be improved by using a plurality of rows of dense gas film holes, but too many holes will increase the manufacturing cost and reduce reliability. In other words, too many gas film holes may reduce the structural strength of the blades. Therefore, a reliable temperature protection gradient of blades provided with discrete gas film holes is generally less than 300 degrees (Yahya, S M (2011), Turbines Compressors and Fans, New delhi: Tata McGraw-Hill Education, 2010. pp. 430-433).

It is a long-term research hotspot about how to improve the gas film cooling structure to obtain turbine blades having a higher operating temperature. In order to improve the poor uniformity of the cooling effect of discrete gas film holes, for example, in patent documents US20110097188A1 etc., gas film cooling holes are provided in shallow blind grooves which are perpendicular to the blade surface, to adjust the surface effect of the ejected airflow from the gas film holes, and blind groove structure with suitable sizes may bring benefits. In the above studies, the cooling holes play a main role in forming the initial gas film, and shallow grooves or grooves with certain depths on the blade surface are auxiliary structure for adjusting the airflow, and the length direction of the grooves are parallel to the centerline of the cooling hole. Although the uniformity of the gas film may be improved through the adjusted configuration according to these technologies, to form a continuous gas film on the blade surface cannot be solved completely. In addition, in the above solutions, the cooling gas is injected in the length direction of the grooves first, and then a gas film perpendicular to the groove is formed in accordance with the rotation effect of the turbine, which has limited effect on improving the uniformity of the gas film coverage of the blades.

SUMMARY

In view of the above technical status, the present disclosure is directed to provide a turbine blade having a hollow structure and including a gas film cooling structure, wherein cooling gas ejected form an inner side of the turbine blade via the gas film cooling structure forms a continuous and uniform cooling gas film on an outer surface thereof, which is efficient in cooling and greatly improves the high temperature resistance of the turbine blade.

In order to achieve the above technical objectives, the inventors of the present disclosure, after long-term research and exploration, provide a gas film cooling structure including discrete holes and grooves on the wall of the turbine blade, and the grooves are designed as composite irregular groove formed by two portions in a depth direction thereof, i.e., a first portion is a middle spreading groove for sufficiently spreading the cooling gas entering through the discrete holes to form a continuous and uniform gas with positive pressure, and a second portion is a lateral expended groove, which allows the gas with positive pressure flows out to outside of the outer surface of the turbine blade, form a continuous and uniform cooling gas film adhered on the outer surface of the turbine blade.

That is, the technical solution of the present disclosure is as follows.

A turbine blade having a gas film cooling structure with a composite irregular groove, wherein the turbine blade has a hollow structure, a plurality of first grooves which are recessed grooves are provided on an outer surface of the turbine blade, and the first groove includes a bottom and two side surfaces parallel to a length direction of the first groove, wherein a plurality of discrete holes A extending to an inner surface of the turbine blade are provided at the bottom of each first groove, the discrete holes A are arranged substantially along the length direction of the first groove, wherein a depth of each first groove is H, wherein the first groove includes at least two portions in a depth direction, a portion having a depth of $H_1$ from the bottom of the first groove is a first portion, and a rest thereof is a second portion, i.e., a depth of the second portion is $H_2=H-H_1$, and wherein at least one side surface of the second portion is formed by expanding in lateral direction from a corresponding side surface of the first portion.

In the turbine blade with the above structure, the cooling gas enters the first groove through the discrete holes A, and is sufficiently diffused and mixed in the first portion, forms a uniform gas with positive pressure, and then flows, via the second portion, to an opening end at the outer surface of the turbine blade and flows out, forming a uniform and continuous cooling gas film on the outer surface of the turbine blade.

A method of manufacturing the turbine blade having the above-mentioned structure is not specially limited. For example, the turbine blade may be manufactured by 3D printing technology, integral processing technology, etc. The present disclosure also provides a method of manufacturing the above-mentioned turbine blade having a gas film cooling structure with a composite irregular groove comprising: first, separately preparing the turbine blade in at least two parts; second, forming the first grooves on an outer surface of each part, and forming the discrete holes A on an inner surface of each part; and third, combining the at least two parts to obtain the turbine blade having a gas film cooling structure with a composite irregular groove. Alternatively, the method comprises sequentially processing and forming the second portion, the first portion, and the discrete holes A of the first grooves on the outer surface of the turbine blade, thereby obtaining the turbine blade having a gas film cooling structure with a composite irregular groove.

The manufacturing process is not specially limited, and may include mechanical processing, laser processing, electrochemical processing, and so on.

In order to further improve the continuity, uniformity and adhesion of the cooling gas film, the present disclosure also proposes an optimized turbine blade structure.

That is, a turbine blade having a gas film cooling structure with a composite irregular groove, wherein the turbine blade has a hollow structure, a plurality of first grooves which are recessed grooves are provided on an outer surface of the turbine blade, and an inner surface of the turbine blade includes a plurality of second grooves which are recessed grooves, wherein the first groove includes a bottom and two side surfaces parallel to a length direction of the first groove, wherein the second groove includes a bottom and two side surfaces parallel to a length direction of the second groove, wherein a plurality of discrete holes A extending to the bottom of the second groove are provided at the bottom of each first groove, and the discrete holes A are arranged substantially along the length direction of the first groove, wherein a depth of each first groove is H, wherein the first groove includes at least two portions in a depth direction, wherein a portion having a depth of $H_1$ from the bottom of the first groove is a first portion, and a rest thereof is a second portion, i.e., a depth of the second portion is $H_2=H-H_1$, wherein at least one side surface of the second portion is formed by expanding in lateral direction from a corresponding side surface of the first portion.

In the above optimized structure, the inner surface of the turbine blade is provided with the second grooves. By introducing the second grooves, the efficiency of the cooling airflow flowing to the discrete holes A is improved, generates a positive pressure, and reduces the processing depth of the gas ejecting hole.

A height of the second groove is selectively determined to efficiently sputter the cooling gas and form a positive pressure.

The method of manufacturing the turbine blade with the above structure is not specially limited. For example, the turbine blade may be manufactured by 3D printing technology, integral processing technology, etc. The present disclosure also provides a method of manufacturing the above-mentioned turbine blade having a gas film cooling structure with a composite irregular groove comprising: first, separately preparing the turbine blade in at least two parts; second, forming the first grooves on an outer surface of each part, and forming the second grooves and the discrete holes A on an inner surface of each part; and third, combining the at least two parts to obtain the turbine blade having a gas film cooling structure with a composite irregular groove.

The manufacturing process is not limited, and may include mechanical processing, laser processing, electrochemical processing, and so on.

In order to further improve the continuity, uniformity and adhesion of the cooling gas, the present disclosure also proposes another optimized turbine blade structure.

A turbine blade having a gas film cooling structure with a composite irregular groove, wherein the turbine blade has a hollow structure, a hollow cavity is formed between an inner surface and an outer surface of the turbine blade, a plurality of discrete holes B extending to the hollow cavity are provided on the inner surface of the turbine blade, wherein a plurality of first grooves which are recessed grooves are provided on an outer surface of the turbine blade, and the first groove includes a bottom and two side surfaces parallel to a length direction of the first groove, wherein a plurality of discrete holes A extending to the hollow cavity are provided at the bottom of each first groove, and the discrete holes A are arranged substantially along the length direction of the first groove, wherein a depth of each first groove is H, wherein the groove includes at least two portions in a depth direction, a portion having a depth of $H_1$ from the bottom of the first groove is a first portion, and a rest thereof is a second portion, i.e., a depth of the second portion is $H_2=H-H_1$, and wherein at least one side surface of the second portion is formed by expanding in lateral direction from a corresponding side surface of the first portion.

In the optimized structure, the hollow cavity is formed between the inner surface and the outer surface of the turbine blade, the cooling gas first enters the hollow cavity via the discrete holes B for convective cooling, generates a positive pressure, and then enters the first groove via the discrete holes A.

A height of the hollow cavity is selectively determined to efficiently sputter the cooling gas and form a positive pressure.

Preferably, the discrete holes B and the discrete holes A are arranged in a staggered manner.

The discrete holes B may be straight circular holes, diffusion holes, or complex three-dimensional irregular holes.

Preferably, an opening end of the discrete holes B is provided with a chamfered transition or a rounded transition to avoid problems such as stress concentration phenomenon due to sharp angles, and unsmooth gas flow.

The method of manufacturing the turbine blade with the above-mentioned structure is not specifically limited. For example, the turbine blade may be manufactured by 3D printing technology, integral processing technology, etc. The present disclosure also provides a method of manufacturing the above-mentioned turbine blade having a gas film cooling structure with a composite irregular groove comprising: first, separately preparing the turbine blade in at least two parts; second, forming the first grooves and the discrete holes A on an outer surface of each part, and forming the discrete holes B on an inner surface of each part; and third, combining the at least two parts to obtain the turbine blade having a gas film cooling structure with a composite irregular groove.

The manufacturing process is not specifically limited, and may include mechanical processing, laser processing, electrochemical processing, and so on.

Preferably, an angle between a central axis of a bottom of the first groove in the depth direction and a normal of the outer surface of the turbine blade is $\alpha$, and $10°\leq\alpha\leq90°$, preferably $30°\leq\alpha\leq80°$, and more preferably $45°\leq\alpha\leq70°$.

Preferably, in a vertical section of the first groove in a width direction of the first groove, two side surfaces of the first portion are two straight line segments spaced apart from each other, an angle between each straight line segment of the first portion and the bottom of the first groove is preferably 10° to 170°, more preferably 30° to 150°, and more preferably 60° to 120°. The two straight line segments may be parallel to each other, or may form a certain angle. Side surfaces of the second portion may be straight line segments or arc line segments, and preferably, at least one side surface of the second portion is an arc line segment. In addition, preferably, the connection portion where at least one side surface of the first portion and a corresponding side surface of the second portion are connected is a chamfered transition connection or an arc transition connection so that they are smoothly connected.

The maximum diameter of each discrete hole A is d, and the minimum width of the first groove is D. Preferably, $D\geq d$. Preferably, $H\geq 2d$, more preferably, $H\geq 3d$, still more preferably, $H\geq 4d$.

Preferably, $H_1>H_2$, more preferably, $H_1:H_2\geq 2:1$, still more preferably, $H_1:H_2\geq 3:1$, and most preferably, $H_1:H_2\geq 4:1$.

The inner surface and the outer surface of the turbine blade nay be parallel to each other, or may form a certain angle.

The discrete holes A may be straight circular holes, diffusion holes, or complex three-dimensional irregular holes. Preferably, an angle between a central axis of the discrete hole A and the outer surface of the flame tube is $\theta$. The angle $\alpha$ and angle $\theta$ may be different. Preferably, the angle $\theta$ is mainly to reduce a processing thickness of the holes. Generally, it is preferred that $0°\leq\theta\leq60°$, it is more preferred that $10°\leq\theta\leq45°$, and the angle $\alpha$ is configured to ensure a good gas film adhesion.

Preferably, the opening end of the discrete hole A is provided with a chamfered transition, or a rounded transition to avoid problems such as stress concentration phenomenon due to sharp angles, and unsmooth gas flow.

The arrangement of the first groove and the second groove on the outer surface of the turbine blade is not specifically limited. According to an actual shape of the outer surface of the turbine blade, the first groove and the second groove may be arranged in parallel or staggered, and is configured to form a gas film coverage on the entire outer surface of the turbine blade by a continuous gas film formed by the first groove.

Compared with solutions in the prior art, in the present disclosure, the wall of the turbine blade is provided with the discrete holes A and the first grooves to form a gas film cooling structure, the first groove is a composite irregular groove including two portions in the depth direction of the groove, the first portion has a depth of $H_1$, forms a middle expansion groove, the second portion has a depth of $H_2$, forms a lateral expended groove. Such a structure has the following advantageous effects.

(1) After the cooling gas enters the first groove through the discrete holes, since the first groove is a composite irregular groove including two portions, having a relatively larger depth, and the vertical section in the width direction of the first groove has a long and narrow shape. As shown in FIG. 1, diffused gas from each discrete hole may not only diffuse and mix in the length direction of the first groove, but also diffuse, mix, and superimpose on each other in the depth direction of the first groove. That is, the gas may sufficiently spread in the first portion of the first groove, forms a continuous and uniform gas with positive pressure, and then flows to the opening end via the second portion of the first groove. The shape of the opening end is optimized according to aerodynamic requirements of gas film adhesion, so that the gas flows out from a side close to the outer surface of the turbine blade, to form a continuous and uniform cooling gas film adhered on the outer surface of the turbine blade. Since the first groove has a relatively larger depth, the cooling gas flowing out from the opening end of the first groove has a higher air pressure, and thus the continuous and uniform cooling gas film formed on the outer surface of the turbine blade strongly attaches to the outer surface of the turbine blade. That is, in the present disclosure, the structure of the composite irregular groove is configured to form the continuous, uniform and strongly attached cooling gas film. The cooling gas enters the first groove through the discrete holes A, sufficiently diffuses and mixes in the first portion, forms a uniform gas with positive pressure, and then flows, via the second portion, to an opening end at the outer surface of the turbine blade and flows out to form a uniform and continuous gas film on the outer surface of the turbine blade.

(2) An aerodynamic simulation diagram of the turbine blade through which cooling gas passes according to the present disclosure. As shown in FIG. 1, it is confirmed that, in the present disclosure, the cooling gas may be injected into the first groove via the discrete holes A, expand and mix in the first groove and form a continuous and uniform gas with positive pressure, and form a gas film coverage on the entire outer surface of the turbine blade.

(3) It is confirmed by experiments that when the turbine blades in the combustion chamber of the present disclosure are in a high temperature gas environment, the cooling gas may form a gas film coverage on the entire outer surface of the turbine blade, and thus achieves a good cooling effect. When compared in the equivalent cooling efficiency=(gas temperature−temperature measured in the flame tube at a certain distance from the inner surface of the flame tube)/ (gas temperature−temperature of the cooling gas), in the case that the blowing ratio of the cooling gas M=1.5, in the turbine blade of the present disclosure, at a distance of larger than 10 mm from the outer surface of the turbine blade, the equivalent cooling efficiency is larger than 0.5, and when the blowing ratio of the cooling gas increases, the equivalent cooling efficiency may be increased to larger than 0.7.

(4) The turbine blade of the present disclosure has a wide range of applications, including aero-engines, gas turbine aircrafts, flying cars, and power generation systems, etc.

DETAILED DESCRIPTION OF THE EMBODIMENTS

The present disclosure will be further described in detail below in conjunction with the embodiments. It should be indicated that the following embodiments are intended to facilitate the understanding of the present disclosure but not to limiting the scope of the present disclosure.

Reference Signs in FIGS. 2-8

14—discrete hole B;
15—hollow cavity;
100—turbine blade;
101—outer surface of the turbine blade;
102—inner surface of the turbine blade;
105—first groove;
106—combining line;
107—second groove;
301—second portion of the groove;
302—first portion of the groove;
400—discrete hole A;
500—bottom of the first groove;
501—bottom of the second groove;
600, 700—two side surfaces of the first groove; and
601, 701—two side surfaces of the second groove.

Embodiment 1

Figure 2:
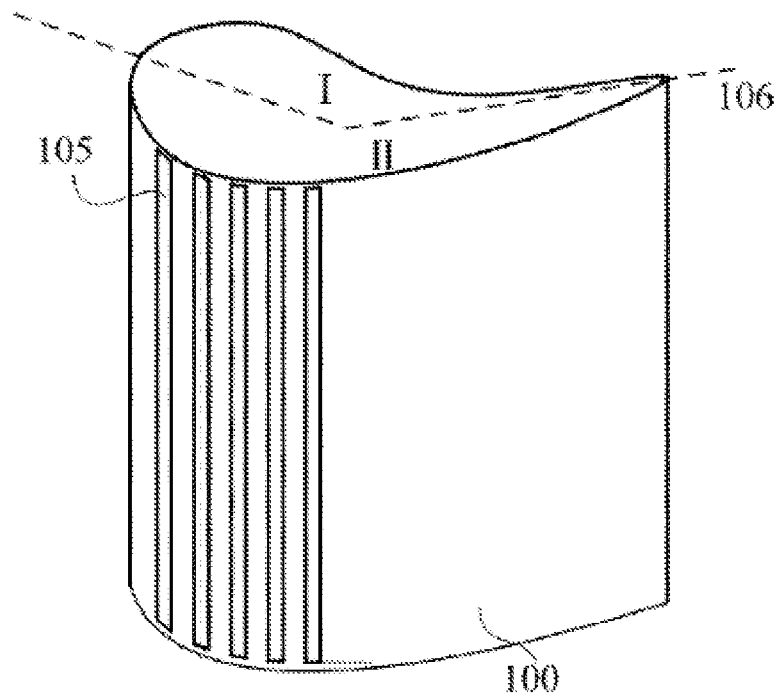
FIG. 2 is a schematic structure diagram of the turbine blade in embodiment 1 of the present disclosure.
Figure 3:
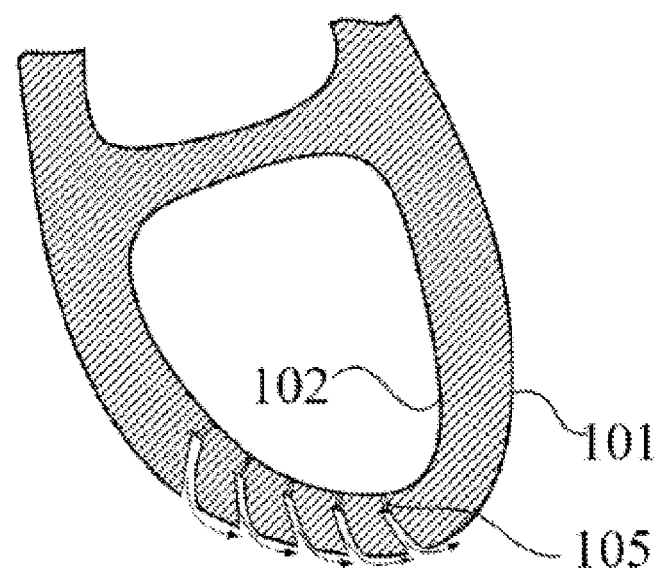
FIG. 3 is a schematic structure diagram illustrating a horizontal section of FIG. 2.

In this embodiment, a turbine blade 100 has a hollow structure, and a structural diagram of the turbine blade is shown in FIG. 2, and FIG. 3 is a structural diagram illustrating a horizontal section of FIG. 2.

A plurality of first grooves 105 spaced apart from and parallel to each other are provided on an outer surface 101 of the turbine blade 100, and the first grooves may partially or entirely extend in a length direction of the outer surface 101 of the turbine blade 100.

Figure 4:
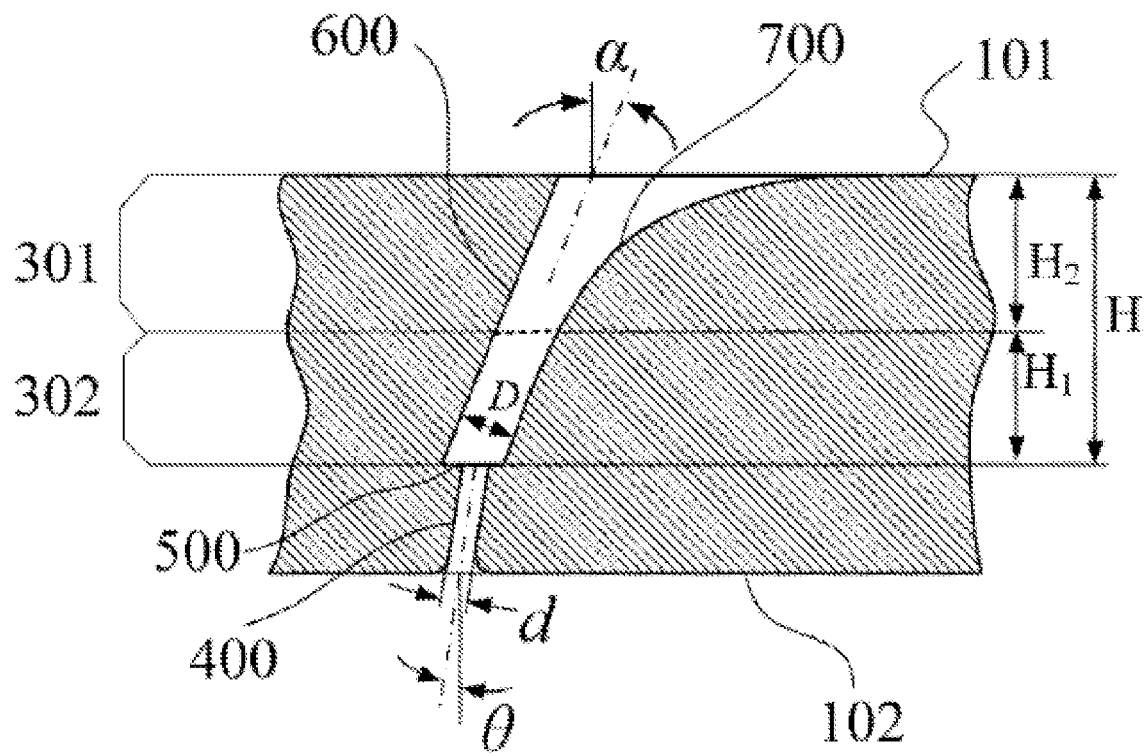
FIG. 4 is a schematic structure diagram of a first groove in FIG. 3.

FIG. 4 is an enlarged structural diagram of a first groove 105 in FIG. 3.

Figure 1:
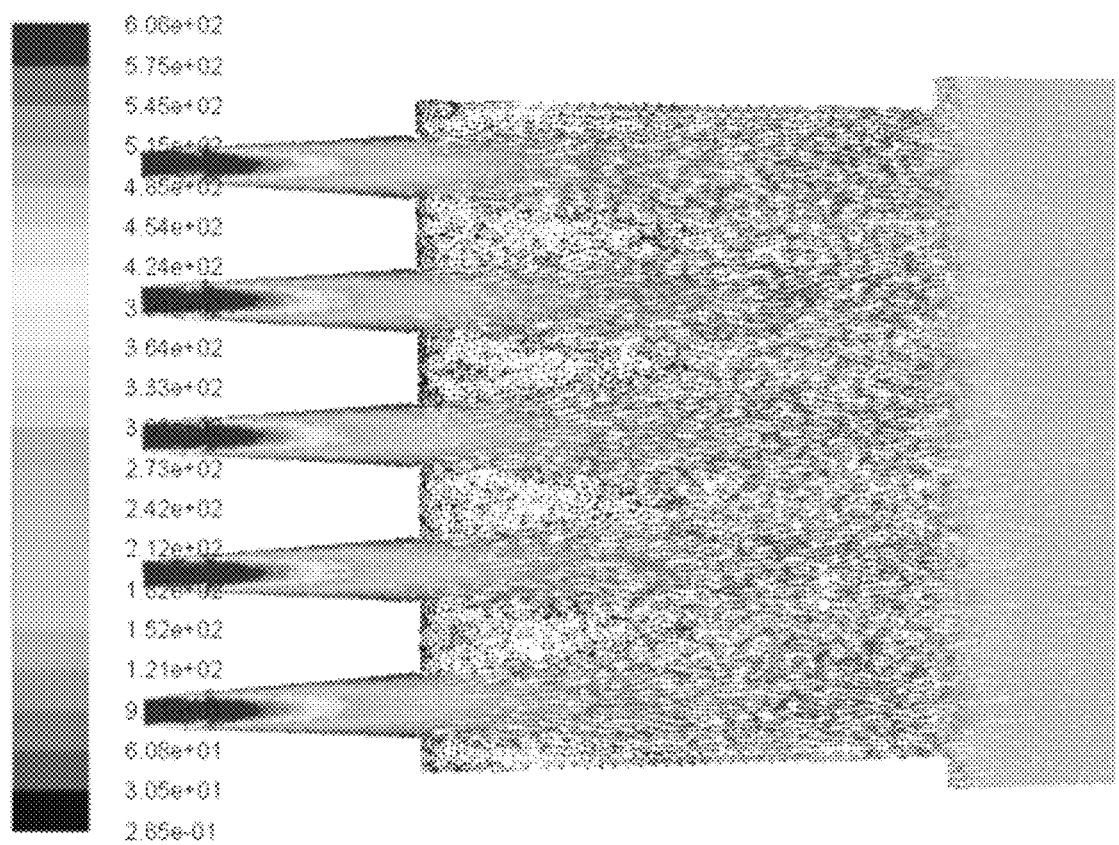
FIG. 1 is an aerodynamic simulation diagram of the turbine blade of the present disclosure through which cooling gas passes.

As illustrated in FIG. 4, each first groove includes a bottom 500 and two groove side surfaces 600 and 700. A plurality of discrete holes A 400 extending to an inner surface 102 of the turbine blade are provided at the bottom of each first groove. In the embodiment, the outer surface 101 of the turbine blade and the inner surface 102 of the turbine blade are substantially parallel to each other. As shown in FIG. 1, the discrete holes A 400 are arranged substantially in a length direction of the first groove 105.

The maximum diameter of the discrete holes A is d, the depth of the first groove is H, and the minimum width of the first groove is D, wherein $D \geq d$, and $H \geq 2d$.

In the embodiment, as shown in FIG. 4, the first groove includes two portions in the depth direction. A portion having a depth $H_1$ from the bottom of the first groove is a first portion 302, and the rest thereof is a second portion 302. In other words, the depth of the second portion is $H_2 = H - H_1$.

In the embodiment, the first portion 302 of the groove has an inclined cylinder shape, and in a vertical section as shown in FIG. 4, two side surfaces of the first portion 302 of the groove are two straight line segments spaced apart from each other, the two straight line segments are parallel to each other, and an angle between each straight line segment of the first portion and the bottom of the first groove is 70°; one side surface of the second portion is also a straight line segment and is formed by extending from a corresponding side surface of the first portion, and the other side surface of the second portion is an arc line segment and is formed by expanding in lateral direction from the other side surface of the first portion. In the embodiment, an angle $\alpha$ between an axis of an opening end of each second portion in the depth direction and a normal of the outer surface 101 of the turbine blade is 30°.

In the embodiment, $H_1$ is slightly larger than $H_2$.

In the embodiment, an angle $\theta$ between a central axis of the discrete hole and a normal of the inner surface 102 of the turbine blade is 15°, and an opening end of the hole is provided with a rounded transition to avoid the stress concentration phenomenon due to sharp angles.

Figure 5:
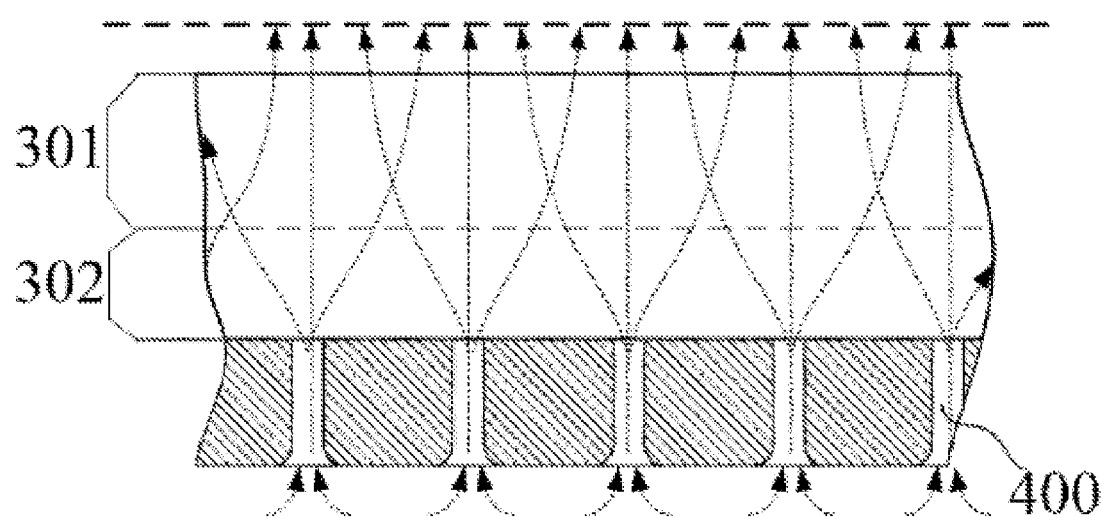
FIG. 5 is a schematic diagram of cooling gas flow in a first groove of FIG. 3.

FIG. 5 is a schematic diagram of cooling gas flow in a first groove of FIG. 3. After the cooling gas inside the inner surface 102 of the turbine blade enters the first groove through the discrete holes A, the gas from each discrete hole A may not only diffuse and mix in the length direction of the first groove, but also diffuse, mix, and superimpose on each other in the depth direction of the first groove. That is, the gas may sufficiently spread in the first portion of the first groove to form a continuous and uniform gas with positive pressure, and then flows, via the second portion of the first groove, to an opening end at the outer surface of the turbine blade and flows out, to form a continuous and uniform gas film adhered on the outer surface 101 of the turbine blade. Since the first groove has a relatively larger depth, the gas flowing out from the opening end of the first groove has a higher air pressure, and thus the continuous and uniform gas film formed on the outer surface of the turbine blade strongly attaches to the outer surface of the turbine blade.

In the embodiment, a method of manufacturing the above-mentioned turbine blade includes: first, separately preparing the turbine blade 100 in two parts, i.e., as shown in FIG. 2, part I and part II, wherein part I and part II are combined at the combining line 106 to obtain a complete turbine blade 100; second, forming the first grooves 105 on an outer surface of part I, forming the discrete holes A on an inner surface of part I, forming the first grooves 105 on an outer surface of part II, and forming the discrete holes A on an inner surface of part II; and third, combining part I and part II at the combining line 106 to obtain a complete turbine blade 100.

Embodiment 2

In this embodiment, a turbine blade 100 has a hollow structure, and a structural diagram of the turbine blade is shown in FIG. 2, and FIG. 3 is a structural diagram illustrating a horizontal section of FIG. 2.

A plurality of first grooves 105 spaced apart from and parallel to each other are provided on an outer surface 101 of the turbine blade 100, the first grooves may partially or entirely extend in a length direction of the outer surface 101 of the turbine blade 100. A plurality of second grooves 107 spaced apart from and parallel to each other are provided on an inner surface 102 of the turbine blade 100.

Figure 6:
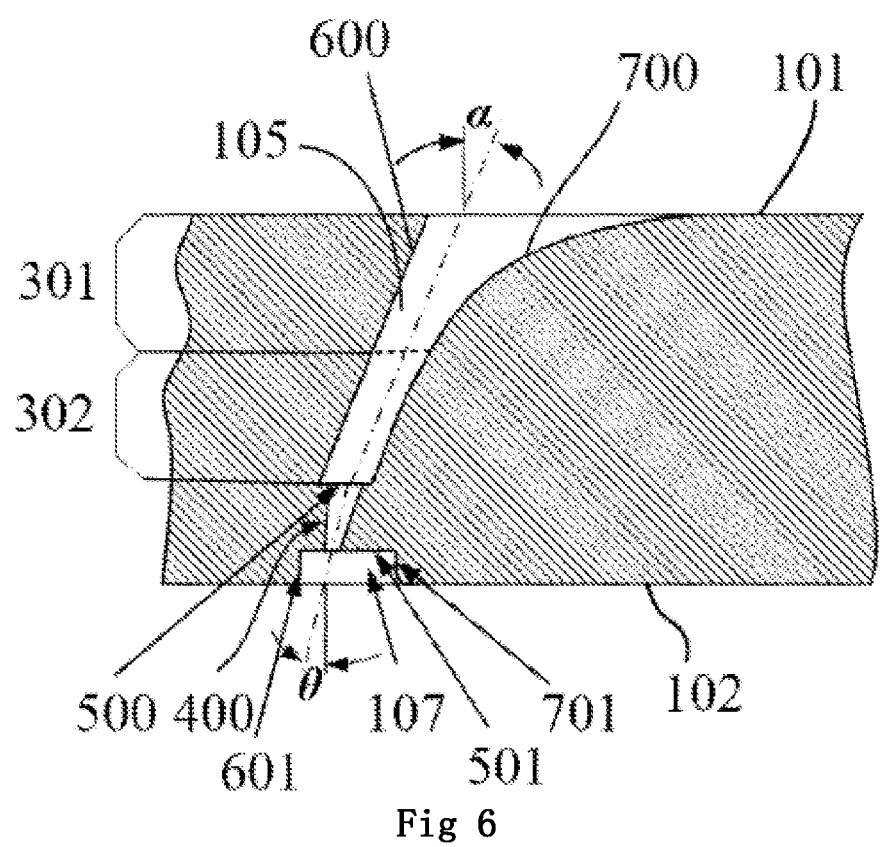
FIG. 6 is a schematic structure diagram of the turbine blade in embodiment 2 of the present disclosure.

FIG. 6 is an enlarged structural diagram of a first groove 105 and a second groove 107 in FIG. 3.

As illustrated in FIG. 6, each first groove includes a bottom 500 and two side surfaces 600 and 700. Each second groove 107 includes a bottom 501 and two side surfaces 601 and 701 parallel to a length direction of the second groove. A plurality of discrete holes A 400 extending to the bottom of the second groove are provided at the bottom of each first groove, and the discrete holes A 400 are arranged substantially along a length direction of the first groove 105.

The maximum diameter of the discrete holes A is d, the depth of the first groove is H, and the minimum width of the first groove is D, wherein D≥d, and H≥2d.

In the embodiment, the first groove 105 includes two portions in the depth direction. As shown in FIG. 6, a portion having a depth of $H_1$ from the bottom of the first groove is a first portion 302, and the rest thereof is a second portion 302. In other words, the depth of the second portion is $H_2=H-H_1$.

In the embodiment, the first portion 302 of the groove has an inclined cylinder shape, and in a vertical section as shown in FIG. 6, two side surfaces of the first portion 302 of the groove are two straight line segments spaced apart from each other, the two straight line segments are parallel to each other, and an angle between each straight line segment of the first portion and the bottom of the first groove is 70°; one side surface of the second portion is also a straight line segment and is formed by extending from a corresponding side surface of the first portion, and the other side surface is an arc line segment and is formed by expanding in lateral direction from the other side surface of the first portion. In the embodiment, an angle α between an axis of an opening end of each second portion in the depth direction and a normal of the surface 101 of the turbine blade is 30°.

In the embodiment, $H_1$ is slightly larger than $H_2$.

In the embodiment, an angle θ between a central axis of the discrete hole A and a normal of the inner surface 102 of the turbine blade is 15°, and an opening end of the hole is provided with a rounded transition to avoid the stress concentration phenomenon due to sharp angles.

In the embodiment, the flow path of the cooling gas at the wall of the turbine blade includes: the cooling gas inside the inner surface 102 of the turbine blade is transmitted to the second groove, and efficiently flows along the second groove and generates a positive pressure, and then enters the first groove via the discrete holes A; and the cooling gas from each discrete hole A may not only diffuse and mix in the length direction of the first groove, but also diffuse, mix, and superimpose on each other in the depth direction of the first groove. That is, the gas may sufficiently spread in the first portion of the first groove to form a continuous and uniform gas with positive pressure, and then flows, via the second portion of the first groove, to an opening end at the outer surface of the turbine blade and flows out, to form a continuous and uniform gas film adhered on the outer surface of the turbine blade. Since the first groove has a relatively larger depth, the gas flowing out from the opening end of the first groove has a higher air pressure, and thus the continuous and uniform gas film formed on the outer surface of the turbine blade strongly attaches to the outer surface of the turbine blade.

In the embodiment, a method of manufacturing the above-mentioned turbine blade includes: first, separately preparing the turbine blade 100 in two parts, i.e., as shown in FIG. 2, part I and part II, wherein part I and part II are combined at the combining line 106 to obtain a complete turbine blade 100; second, forming the first grooves 105 on an outer surface of part I, forming the second grooves 107 and the discrete holes A on an inner surface of part I, forming the first grooves 105 on an outer surface of part II, and forming the second grooves 107 and the discrete holes A on an inner surface of part II; and third, combining part I and part II at the combining line 106 to obtain a complete turbine blade 100.

Embodiment 3

Figure 7:
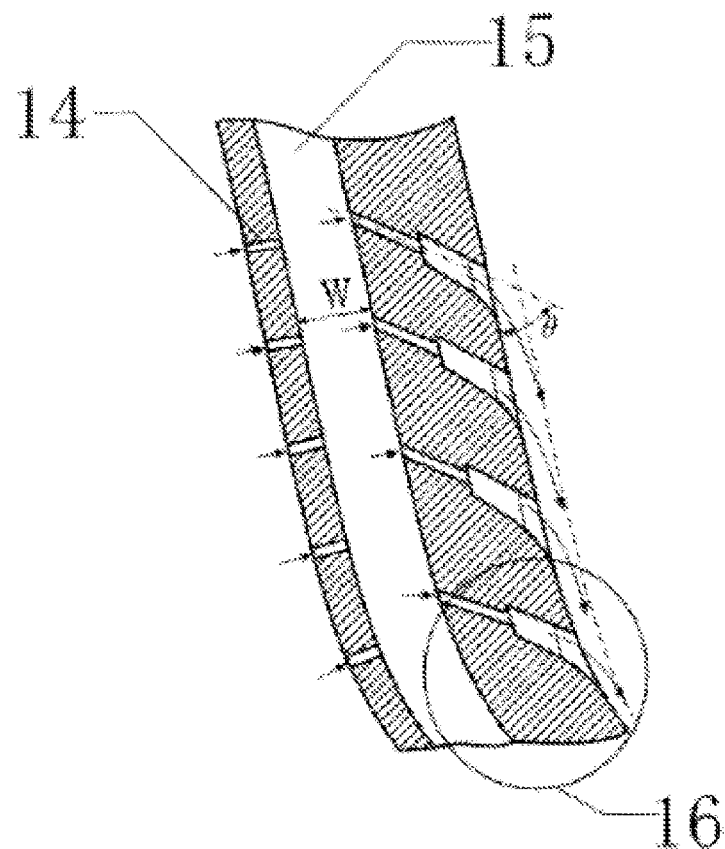
FIG. 7 is a schematic structure diagram illustrating a horizontal section of the turbine blade in embodiment 3 of the present disclosure.

In this embodiment, a turbine blade 100 has a hollow structure, and a structural diagram of the turbine blade is shown in FIG. 2, and FIG. 7 is a structural diagram illustrating a horizontal section of FIG. 2.

As shown in FIG. 7, a hollow cavity 15 is formed between an inner surface 102 and an outer surface 101 of the turbine blade 100. A plurality of discrete holes B 14 extending to the hollow cavity 15 are provided on the inner surface 102 of the turbine blade.

A plurality of first grooves 105 spaced apart from and parallel to each other are provided on an outer surface 101 of the turbine blade 100, the first grooves may have a length partially or entirely extending in a length direction of the outer surface 101 of the turbine blade 100.

Figure 8:
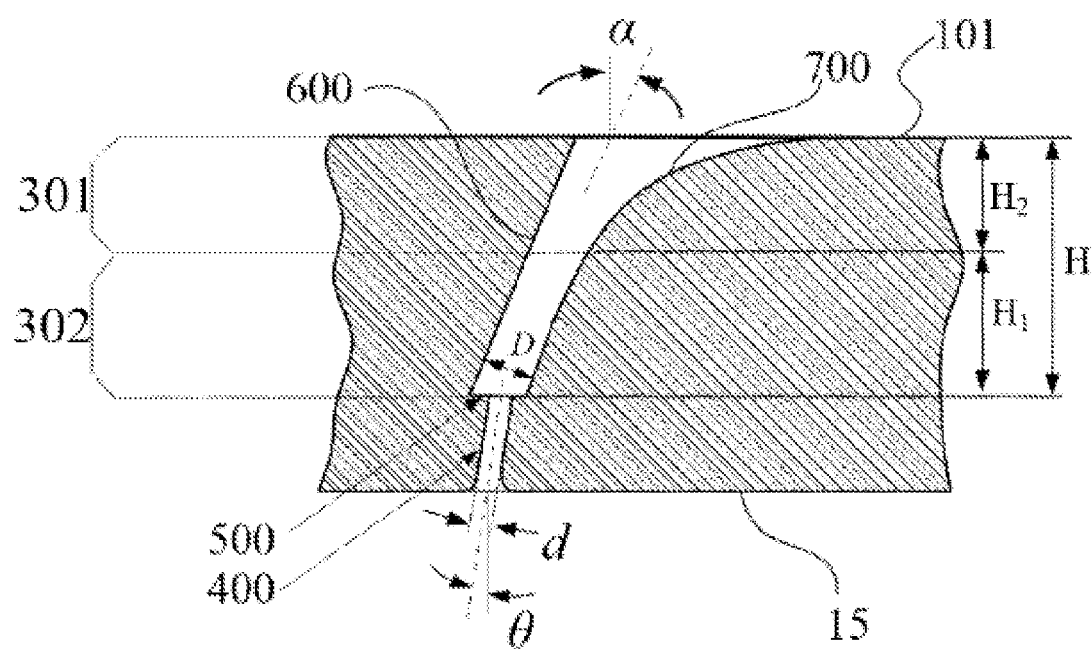
FIG. 8 is a schematic structure diagram of a first groove in FIG. 7.

FIG. 8 is an enlarged structural diagram of a first groove 105 in FIG. 7.

As illustrated in FIG. 8, each first groove 105 includes a bottom 500 and two side surfaces 600 and 700. A plurality of discrete holes A 400 extending to the hollow cavity 15 are provided at the bottom of each first groove.

In the embodiment, the outer surface 101 of the turbine blade and the inner surface 102 of the turbine blade are substantially parallel to each other. As shown in FIG. 1, the discrete holes A 400 are arranged substantially along a length direction of the first groove.

The maximum diameter of the discrete holes A is d, the depth of the first groove is H, and the minimum width of the first groove is D, wherein D≥d, and H≥2d.

In the embodiment, the first groove includes two portions in the depth direction. As shown in FIG. 4, a portion having a depth of $H_1$ from the bottom of the first groove is a first portion 302, and the rest thereof is a second portion 302. In other words, the depth of the second portion is $H_2=H-H_1$.

In the embodiment, the first portion 302 of the groove has an inclined cylinder shape, and in a vertical section as shown in FIG. 4, two side surfaces of the first portion 302 of the groove are two straight line segments spaced apart from each other, the two straight line segments are parallel to each other, and an angle between each straight line segment of the first portion and the bottom of the first groove is 70°; one side surface of the second portion is also a straight line segment and is formed by extending from a corresponding side surface of the first portion, and the other side surface is an arc line segment and is formed by expanding in lateral direction from the other side surface of the first portion. In the embodiment, an angle α between an axis of an opening end of each second portion in the depth direction and a normal of the surface 101 of the turbine blade is 30°.

In the embodiment, $H_1$ is slightly larger than $H_2$.

In the embodiment, an angle θ between a central axis of the discrete hole A and a normal of the inner surface 102 of the turbine blade is 15°, and an opening end of the hole is provided with a rounded transition to avoid the stress concentration phenomenon due to sharp angles.

In the embodiment, the flow path of the cooling gas at the wall of the turbine blade includes: the cooling gas inside the inner surface 102 of the turbine blade enters the hollow cavity 15 via the discrete holes B, efficiently flows in the hollow cavity 15 and generates a positive pressure, and then enters the first groove via the discrete holes A; and the cooling gas from each discrete hole A may not only diffuse and mix in the length direction of the first groove, but also diffuse, mix, and superimpose on each other in the depth direction of the first groove. That is, the gas may sufficiently spread in the first portion of the first groove to form a continuous and uniform gas with positive pressure, and then flows, via the second portion of the first groove, to an opening end at the outer surface of the turbine blade and flows out, to form a continuous and uniform gas film adhered on the outer surface of the turbine blade. Since the first groove has a relatively larger depth, the gas flowing out from the opening end of the first groove has a higher air pressure, and thus the continuous and uniform gas film formed on the outer surface of the turbine blade strongly attaches to the outer surface of the turbine blade.

In the embodiment, a method of manufacturing the above-mentioned turbine blade includes: first, separately preparing the turbine blade 100 in two parts, i.e., as shown in FIG. 2, part I and part II, wherein part I and part II are combined at the combining line 106 to obtain a complete turbine blade 100; second, forming the first grooves 105 and the discrete holes A on an outer surface of part I, forming the discrete holes B on an inner surface of part I, forming the first grooves 105 and the discrete holes A on an outer surface of part II, and forming the discrete holes B on an inner surface of part II; and third, combining part I and part II at the combining line 106 to obtain a complete turbine blade 100.

The above-mentioned embodiments are detailed descriptions of the technical solution of the present disclosure. It is understood that the above-mentioned embodiments are only specific embodiments of the present disclosure and are not intended to limit the scope of the present disclosure. Any modifications, supplements, or substitutions within the scope of the principles of the present disclosure shall be included in the protection scope of the appended claims.

What is claimed is:

1. A turbine blade having a gas film cooling structure with a composite irregular groove, wherein the turbine blade has a hollow structure, and a plurality of first grooves which are irregular grooves are provided on an outer surface of a wall of the turbine blade, wherein each first groove comprises a bottom and two side surfaces parallel to a length direction of the first groove, wherein a plurality of discrete holes A extending to an inner surface of the wall of the turbine blade are provided at the bottom of each first groove, and the discrete holes A are arranged substantially along the length direction of the first groove, wherein a depth of each first groove is H, wherein each first groove includes at least two portions in a depth direction, a portion having a depth of $H_1$ from the bottom of the first groove is a first portion, and a rest thereof is a second portion, i.e., a depth of the second portion is $H_2=H-H_1$, wherein at least one side surface of the second portion is a curved surface, and a width of the second portion increases from an end close to the first portion, wherein the maximum diameter of each discrete hole A is d, the depth of each first groove is H, and the minimum width of each first groove is D, and wherein D≥d, H≥2d, and $H_1 \geq H_2$.

2. The turbine blade having a gas film cooling structure with a composite irregular groove of claim 1, wherein an angle between an axis of an opening end of each first groove in the depth direction and a normal of the outer surface of the wall of the turbine blade is α, and 10°≤α≤90°.

3. The turbine blade having a gas film cooling structure with a composite irregular groove of claim 1, wherein a connection portion where at least one side surface of the first portion and a corresponding side surface of the second portion are connected is a chamfered transition connection or an arc transition connection.

4. The turbine blade having a gas film cooling structure with a composite irregular groove of claim 1, wherein the maximum diameter of each discrete hole A is d, the depth of each first groove is H, and the minimum width of each first groove is D, and wherein D≥d, and H≥2d.

5. The turbine blade having a gas film cooling structure with a composite irregular groove of claim 1, wherein the discrete holes A are straight circular holes, diffusion holes, or complex composite irregular holes, wherein, an angle between a central axis of each discrete hole A and a normal of surface of the turbine blade is θ, and 0°≤θ≤60°, and wherein, an opening end of each discrete hole A is provided with a chamfered transition, or a rounded transition.

6. The turbine blade having a gas film cooling structure with a composite irregular groove of claim 1, wherein $H_1:H_2 \geq 2:1$.

7. A turbine blade having a gas film cooling structure with a composite irregular groove, wherein the turbine blade has a hollow structure, a hollow cavity is formed between an inner surface and an outer surface of a wall of the turbine blade, and a plurality of discrete holes B extending to the hollow cavity are provided on the inner surface of a wall of the turbine blade, wherein a plurality of first grooves which are irregular grooves are provided on an outer surface of the wall of the turbine blade, and each first groove comprises a bottom and two side surfaces parallel to a length direction of the first groove, wherein a plurality of discrete holes A extending to the hollow cavity are provided at the bottom of each first groove, and the discrete holes A are arranged substantially along the length direction of the first groove, wherein a depth of each first groove is H, wherein each first groove includes at least two portions in a depth direction, a portion having a depth of $H_1$ from the bottom of the first groove is a first portion, and a rest thereof is a second portion, i.e., a depth of the second portion is $H_2=H-H_1$, and wherein at least one side surface of the second portion is a curved surface, and w width of the second portion increase from an end close to the first portion.

8. The turbine blade having a gas film cooling structure with a composite irregular groove of claim 7, wherein an angle between an axis of an opening end of each first groove in the depth direction and a normal of the outer surface of the wall of the turbine blade is $\alpha$, and $10°\leq\alpha\leq90°$.

9. The turbine blade having a gas film cooling structure with a composite irregular groove of claim 7, wherein a connection portion where at least one side surface of the first portion and a corresponding side surface of the second portion are connected is a chamfered transition connection or an arc transition connection.

10. The turbine blade having a gas film cooling structure with a composite irregular groove of any one of claim 7, wherein the maximum diameter of each discrete hole A is d, the depth of each first groove is H, and the minimum width of each first groove is D, and wherein $D\geq d$, and $H\geq 2d$.

11. The turbine blade having a gas film cooling structure with a composite irregular groove of claim 7, wherein the discrete holes A are straight circular holes, diffusion holes, or complex composite irregular holes, wherein, an angle between a central axis of each discrete hole A and a normal of surface of the turbine blade is $\theta$, and $0°\leq\theta\leq60°$, and wherein, an opening end of each discrete hole A is provided with a chamfered transition, or a rounded transition.

12. The turbine blade having a gas film cooling structure with a composite irregular groove of claim 7, wherein $H_1:H_2\geq 2:1$.

* * * * *